United States Patent

[11] 3,522,764

[72] Inventors Conrad H. Biber
 Needham, Massachusetts;
 William R. Pope, Jr., Cambridge,
 Massachusetts
[21] Appl. No. 715,644
[22] Filed March 25, 1968
[45] Patented Aug. 4, 1970
[73] Assignee Polaroid Corporation
 Cambridge, Massachusetts
 a corp of Delaware

[54] RANGEFINDING AND FOCUSING SYSTEM FOR PHOTOGRAPHIC CAMERAS AND THE LIKE
20 Claims, 7 Drawing Figs.

[52] U.S. Cl. .................................................. 95/44,
 325/102, 340/221
[50] Field of Search .......................................... 95/44c;
 325/102; 340/221

[56] References Cited
UNITED STATES PATENTS

| | | | |
|---|---|---|---|
| 3,061,812 | 10/1962 | Rachwalski .................. | 340/3 |
| 3,119,091 | 1/1964 | Hopkin et al .................. | 340/3 |
| 3,123,797 | 3/1964 | Ehrman ........................ | 340/1 |
| 3,148,330 | 9/1964 | Malerbi ........................ | 325/102 |
| 3,153,195 | 10/1964 | Kille et al ..................... | 325/102 |
| 3,185,056 | 5/1965 | Gold et al ..................... | 340/221X |
| 3,307,107 | 2/1967 | Kagan ........................... | 325/102 |

Primary Examiner— Norton Ansher
Assistant Examiner— Richard M. Sheer
Attorney— Brown and Mikulka, William D. Roberson and Gerald L. Smith ABSTRACT: Sonic rangefinding and focusing apparatus for use with photographic cameras and the like. The rangefinder derives a pulse length modulated signal representative of object distance. This signal is used to cause the energization of a servomotor which is mechanically coupled to the translational focusing mechanism of a lens system. Feedback signals are generated in the apparatus for deriving error signals and a comparison signal representing the infinity stop of the lens system.

Patented Aug. 4, 1970

INVENTORS
Conrad H. Biber
and
William R. Pope Jr.
BY Brown and Mikulka
and
Gerald L. Smith
ATTORNEYS

U.S. PATENT 3,522,764
RANGEFINDING AND FOCUSING SYSTEM FOR PHOTOGRAPHIC CAMERAS AND THE LIKE

BACKGROUND OF THE INVENTION

Rangefinders routinely encountered in the photographic arts are generally designed to operate on the basis of optical triangulation. The ranging devices function to determine the object distance or distance to an object at which it is desired that a camera lens system produce an image of desired sharpness. To triangulate optically the rangefinders are designed to permit the camera operator to observe a target positioned at the object distance through two or more mutually displaced optical paths. Multiple or multi-faceted images of the target are thus perceived by the operator at a rangefinder window. The operator then causes a mergence or alignment of these target images by altering the orientation of the optical paths. By measuring the angular adjustment to the optical paths required to effect the mergence or alignment of target images, the object distance may be determined. Often, the rangefinder mechanism is coupled mechanically to a lens focusing mechanism of the camera so as to minimize the number of adjusting steps required of an operator in making a suitable exposure.

While optical ranging techniques are adequate for determining the range and focus of relatively clear or sharp and stationary objects or scenes, they encounter certain drawbacks in a large number of image recording situations. For instance, some types of photographic subjects are inherently difficult to range optically. Should the subject be characterized by a lack of sharp features, lines or contours, the operator may experience considerable difficulty in determining the point of rangefinder-image convergence. Fast-moving objects, too, can be especially difficult to range by optical techniques. Where the span of time available for performing the step of focusing upon such objects is limited by the transient nature of the scene being photographed, the probability of achieving a sharp focus diminishes.

The manual dexterity requisite to converging optically upon a moving target is often beyond human ability, generally for such conditions the camera lens system is focused upon a stationary target located at an anticipatory point of visitation of the photographed object. In moving object situations, reliance is also made upon the depth of field characteristics of the lens system to provide a focusing margin of error. The term depth of field is considered to be the region in front of and behind the object or focused distance within which the lens system produces an image of a required standard of sharpness. The extent or breadth of this region is a function of the aperture and focal length of the camera lens system. In general, a smaller lens system aperture will result in a larger depth of field. It follows, therefore, that where reliance must be made upon such broader focusing ranges, the advantages which might otherwise be provided by high speed lenses often are not available for photographing moving subjects.

Conventional image-convergence rangefinding systems can be particularly difficult to use where focusing must be performed under dim ambient light conditions. It is somewhat difficult to determine visually the position of image convergence or the like when working with dim target images. These situations are commonly experienced where artificial flash lighting is utilized to illuminate the subject matter photographed. More recently, a need for more versatile focusing or rangefinding techniques has arisen in the field of infrared photography, where acceptable levels of light in the visible spectrum generally are not available.

In additon to the above outlined limitations, the accuracy of an image-convergence rangefinder is somewhat dependent upon the quality of vision of the camera operator. The eyesight of a significant number of amateur photographers is of an acuity insufficient to detect image convergence readily.

SUMMARY OF THE INVENTION

The invention now presented provides a rangefinder for photographic devices and the like which effects object distance or range determination through the media of acoustic energy. Coupled to the lens system of a photographic camera, the distance-finding device is capable of continuously tracking and focusing upon an object within a scene to be photographed. Such a continuous tracking capability allows for automatic lens system focusing adjustment throughout a film exposing procedure. By virtue of this uninterrupted and automatic focal adjustment, moving objects may be photographed with relative ease. For instance, the system readily tracks and focally adjusts to an object moving toward or away from the camera to assure a properly focused exposure. Accordingly, while photographing such subject matter, it is not necessary to focus at an anticipated position of the moving object. Further in this regard, no manual steps for focusing adjustment are required of an operator during an exposure sequence beyond simple activation of the automatic ranging mechanism of the system.

Utilizing sonic transducers which produce signal propagation lobes of relatively narrow configuration, the rangefinding apparatus of the invention is easily aimed at a target situated at the photographic object distance For most applications a proper orientation or aiming of the sonic rangefinder is inherently achieved upon the selection or framing of a scene to be photographed through a camera viewfinder.

Within the cones of propagation, sonic impulses are directed toward a preselected object reflective of sound. Impinging upon and reflecting from the object, the pulsed signals are detected by a camera-mounted transducer. Upon detection the signals are decoded to derive a pulsed signal representative of the object distance. Inasmuch as a distance signal is derived simply from a sound reflective object, it is not necessary for the object to possess clearly visible physical features. Further, the varying acuity of the human eye poses no problem to the present rangefinding system. Where a visible indication of the position of the lobe of propagation is desired, the system may provide for a simple and inexpensive alteration to a conventional viewfinder.

The present rangefinding and focusing system is further characterized in its capablity to operate under the minimal ambient lighting required for viewfinding. Where visible image viewfinding is not possible, the present system still remains operable. Further, the system is fully operable in the total absence of visible illumination and, accordingly, is adaptable to use with infrared photographic systems and the like.

A feature of the invention is to provide a sonic rangefinding apparatus utilizing pulse-modulated encoding means for deriving pulsed signals, the length of which is representative of object distance. The encoding circuitry of the invention is further characterized in providing a pulse-modulated error signal for selectively driving a lens focusing motor. By virtue of its use of a pulsed error signal, the system is capable of driving the lens adjusting servomotor at full torque regardless of the magnitude of adjustment required. As a result, the lens focusing mechanism of the system is capable of high accuracy and fast response when performing only minor adjustive manipulations.

Another feature of the invention is to provide a pulse-modulated sonic rangefinder which is sensitive and responsive to the limiting focusing positions of a coupled camera lens system. Through the use of discriminator circuitry comparing and selecting between an object distance signal and a signal representing a limiting focusing position of the lens system, the system may conform with the design characteristics of any camera. Similarly, by adjusting clock pulse widths within the circuitry, the ranging system provides a "close-up" focusing position limitation. These features further enhance the focusing accuracy of the instant application.

Other features of the invention will in part be obvious and will in part appear hereinafter.

The invention accordingly comprises the system and apparatus possessing the construction, combination of elements and arrangement of parts which are exemplified in the following detailed disclosure For a fuller understanding of the nature and objects of the invention, reference should be had to the following detailed description taken in connection with the accompanying drawings.

DETAILED DESCRIPTION OF THE DRAWINGS

The rangefinding apparatus of the invention may be fabricated in a broad variety of configurations. When physically mounted within or upon a camera, however, the apparatus may comprise three basic functional components: a sonic transducer device including lobe configuring horns where required; a camera lens actuating system for providing focal adjustment; and an intermediate control circuitry. Each of these components is interrelated with the others in a manner providing not only for position-responsive feedback of the objective lens system of a camera but also providing a range limiting feature serving to limit the object distance signal introduced to the lens system actuator to a maximum value corresponding to the infinity stop of the lens. The use of a sonic ranging system advantageously permits consistently accurate focusing within the object distances commonly encountered in the photographic field.

Figure 1:
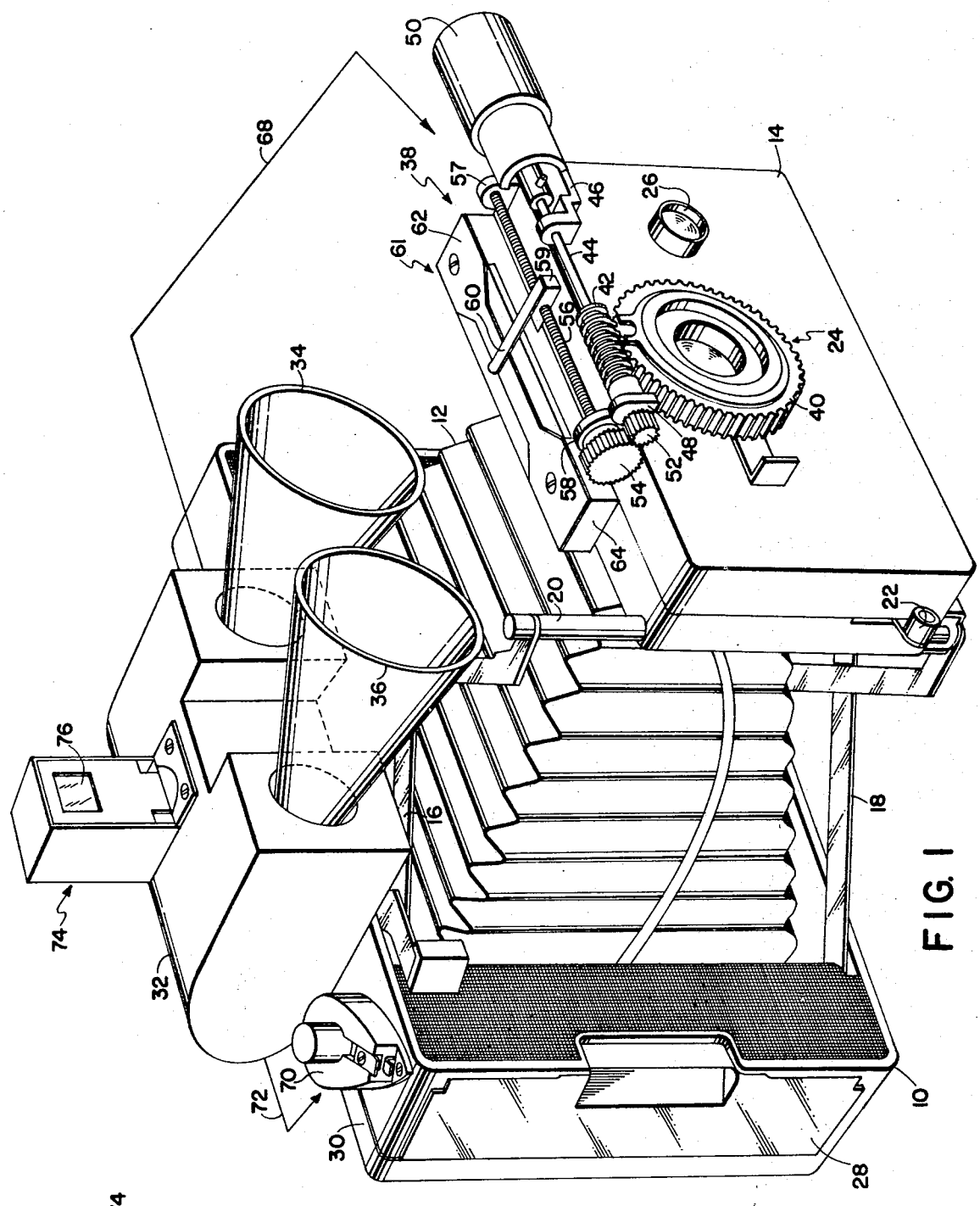
FIGURE 1 is a perspective view showing a conventional camera upon which is mounted a workable embodiment of a sonic rangefinding apparatus in accordance with the invention.

Looking to FIGURE 1, a camera structure is illustrated having a main body housing 10. Extending forwardly from the central portion of the housing 10 is a flexible retractable bellows 12. The outwardly extending periphery of bellows 12 is, in turn, connected to a shutter housing and lens board 14. Lens board 14 is manually erected to a position for film exposure through the media of duplicate dual armed linkages 16 and 18. Linkage 16 is pictured in pivotal connection with housing 14 at a pivot post 20 projecting from the camera front. Extending from the side of shutter housing 14 there is shown a shutter cocking lever 22, and, from the front of the lens board, there projects the outward portion of the objective lens system indicated generally at 24. A photo-cell aperture for use in shutter timing is illustrated as mounted upon lens board 14 at 26. At the rearward portion of the camera, main body housing 10 is seen to incorporate a film access door assembly 28.

The camera structure illustrated will be recognized as representative of a popular instant film processing variety. To incorporate an embodiment of the invention, however, this somewhat conventional camera structure will be seen to have been modified. On the upward surface 30 of the main body housing 10 there is mounted a transducer and logic circuitry housing 32. Protruding outwardly from the housing 32 are acoustic beam shaping horns or antennas 34 and 36. One of these horns, for instance that shown at 34, functions to restrict the lateral splay of the beam pattern of sonic transmissions. For general photographic applications, it has been found desirable to restrict the output beam pattern lobe within a peripheral cone having about a 20° apex angle at the point of transmission. Horn 36, having a structure identical to that of horn 34, serves to receive the reflections of acoustic pulses transmitted at horn 34. Receiving horn 36 is positioned in symmetrical relationship with horn 34, and functions to limit the reception of reflected pulses to those present within a restrictive periphery. The latter restriction minimizes a reception of spurious reflections from non-target objects. It will be apparent to those skilled in the art that the sizes and configurations of horns 34 and 36 may vary. For instance, considerably miniaturized versions of the horns may be desired in lieu of the relatively large dimensioned horns illustrated.

A sonic input signal representative of object distance is developed within a circuitry at housing 32 for the purpose of introducing a pulse length modulated error signal to a lens system adjusting mechanism such as that shown generally at 38.

Lens system 24 is focused by causing an axial translation of one or more of its lens elements. This translation is effected by selectively rotating the peripherally geared bezel ring member 40 which, in turn, is in threaded connection with an internally adjusting lens mount. Geared ring member 40 is driven in a desired direction by a worm gear 42 shown mounted upon a shaft 44. Shaft 44, journaled at mounting brackets 46 and 48, is connected to be rotated by a D.C. servomotor 50. The shaft 44 is also connected at its terminus to an idle-gear 52. Gear 52 is mounted to drive gear 54 which is attached in driving relationship with an elongate screw member 56. Screw member 56 is journaled through supporting brackets 57 and 58. Threadedly connected to the elongate screw 56 is a traveling block 59 to which is attached an electrically conductive wiper arm 60. Wiper arm 60 serves as the tap of a variable resistor 61 whose windings 62 are disposed upon a template 64. Template 64 is mounted upon an electrically insulative block 66 attached to housing 14.

It will be apparent from the foregoing description that an error signal imposed upon motor 50 will energize it into rotation and simultaneously cause the rotation of ring 40 and screw 56. This rotation will both adjust the axial position of the lens element of objective 24 and the position of wiper 60 upon resistor windings 62. As will be discussed in more detail later, the variable resistance derived at resistor 61 serves in the generation of a feedback signal representative of the focal position of objective lens 24. In the interest of clarity, the electrical leads otherwise interconnecting the above-described functions are shown only schematically by a line 68.

Returning to the main body housing 10 of the camera, upon upward surface 30 there is mounted a spring biased push button switch 70 which serves to turn on the rangefinder. Leads for interconnecting switch 70 with the circuitry at 32 are depicted schematically as a singular line at 72.

Figure 2:
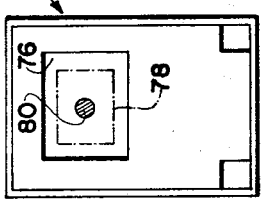
FIGURE 2 is a front view of the viewfinder shown in FIGURE 1 showing a rangefinding, sighting implement in more detail.

At the top of the housing 32 there is shown a viewfinder 74. Viewfinder 74 includes an entrance window 76 and is used in conjunction with the camera in the usual fashion. However, the viewfinder may be adapted to serve an additional function. Turning to FIGURE 2, the window 76 is illustrated having a conventional dotted scene framing line 78 and, additionally, a small partially transparent ring or disc as at 80. Disc 80 serves to provide an indication to the camera operator of the wavefront cross section developed by the sonic transmitter 34. While its use is not mandatory, the information provided when using the disc may be helpful in selecting particular ranging targets at the object distance.

The lens system of conventional cameras typically are designed to require adjustment for focusing within object distances up to about thirty feet. Beyond the latter limiting focusing position or "infinity stop" of the objective lens, the depth of field of the lens system is considered to extend, for practical purposes, to infinity. The rangefinder apparatus of the present invention uniquely recognizes this restrictive range of focusing adjustment. For detecting the somewhat short distances involved, acoustic energy rather than electromagnetic energy is used. This selection is made in view of the relatively slow velocity of propagation of acoustic waves. The lower velocities can be taken advantage of to yield easily handled time differences between the transmission and reception of a pulse even at short distances. Generally, a transmission frequency of about 40 kilohertz will be found suitable for use with the system.

Figure 3:
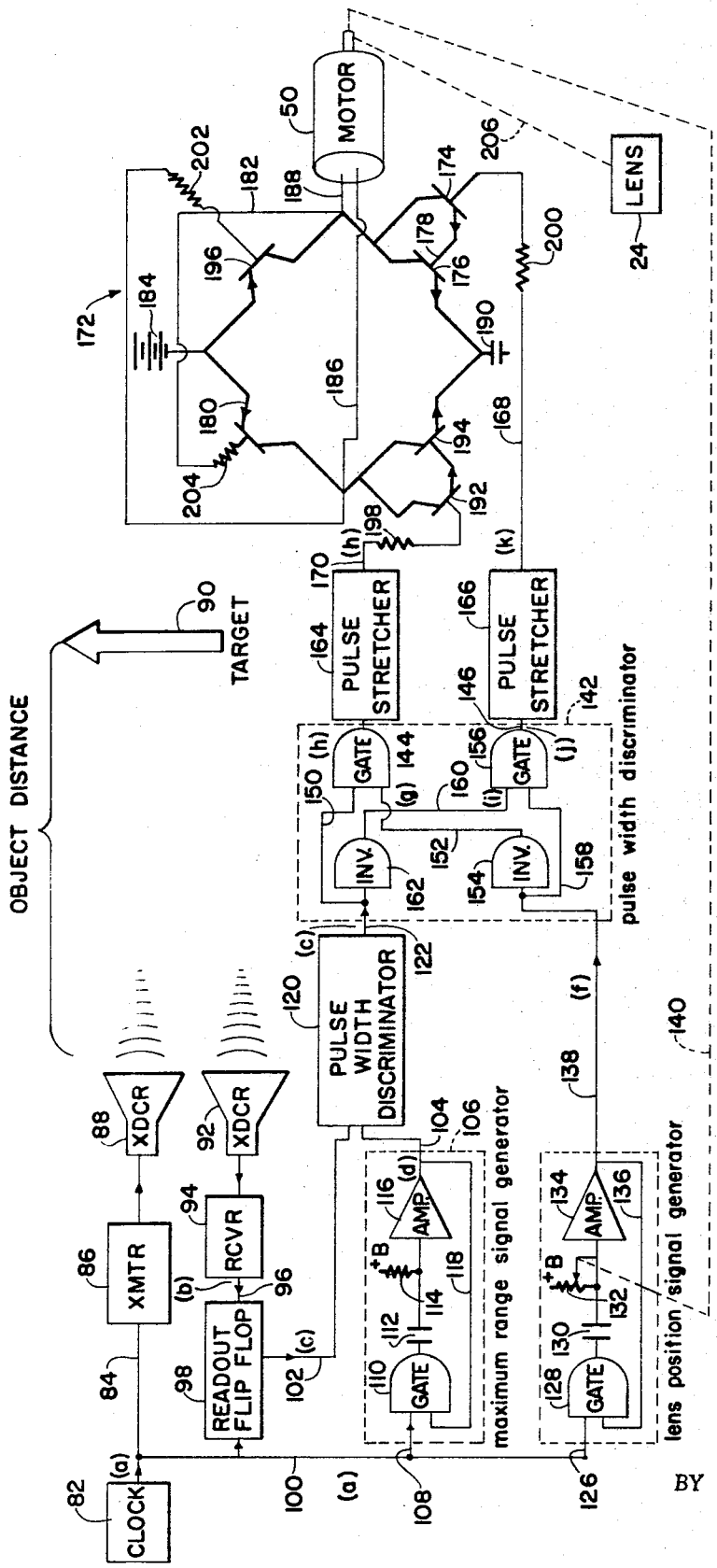
FIGURE 3 is a schematic diagram of a logic ciruitry which may be used with the present invention.
Figure 4:
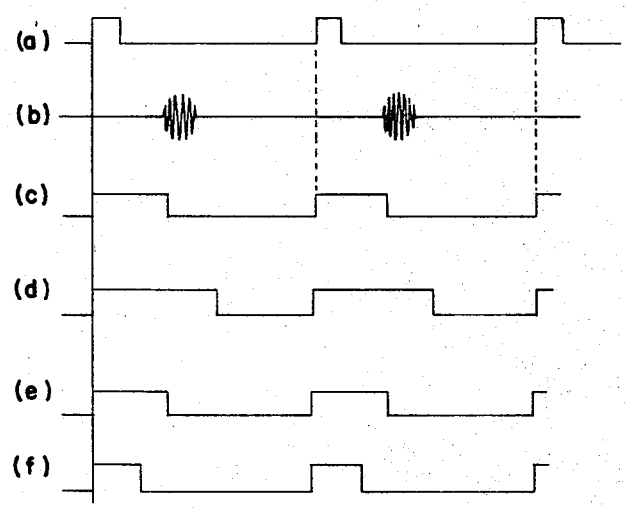
FIGURE 4 is a waveform diagram showing idealized waveforms occurring at various points in FIGURE 3.
Figure 5:
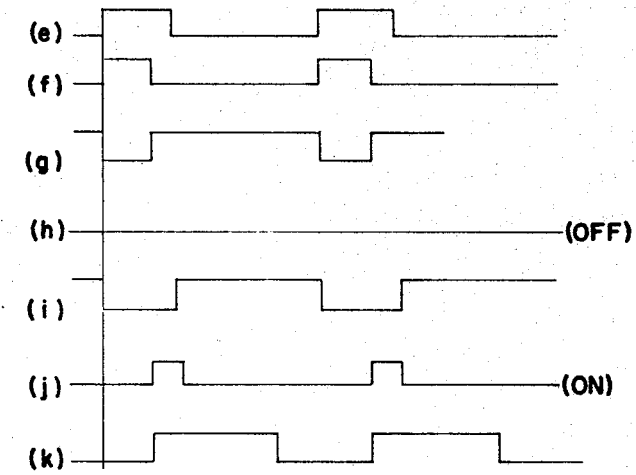
FIGURE 5 is another waveform diagram showing idealized waveforms occurring at various points in FIGURE 3.

Referring to FIGURE 3, a schematic diagram of a circuitry which may be used with the invention is illustrated. The waveforms derived at various positions within this circuitry are designated by small letters. In FIGURES 4 and 5, the same letters are used to depict these pulsed waveforms in time related alignment.

Turning now to FIGURE 3, an astable multivibrator or clock 82 generates a continuous sequence of regularly timed equally dimensioned pulses a. These pulses are introduced from along line 84 to a transmitter 86. Having been gated by pulse a, the transmitter 86 energizes a transducer 88 which generates a corresponding series of sonic impulses. Upon being propagated from transducer 88, each sonic impulse travels outwardly until it strikes and is reflected from a body opaque to sound, such as a target 90 located at an object distance to be determined. The reflected sonic pulse is thence directed backwardly to a receiving transducer 92 and impinges thereon a short time interval later. This time interval between the transmission of the sonic pulse and the receipt of its reflected echo is accordingly representative of twice the object distance, it being assumed that the speed of sound through air is constant.

Transducer 92 upon receipt of a reflected pulse, generates a corresponding signal which, in turn, is amplified at receiver 94 to evoke a waveform (b) at line 96. Waveform (b) is then presented from line 96 to a readout flip-flop 98 which also receives clock pulse (a) from along trunk line 100. Readout flip-flop 98 is selected of a conventional variety designed to derive a signal having pulse width spacing corresponding to twice the object distance. This pulse, as shown as (c) at line 102, is seen to be formed having a width defined between the succeeding leading edges of pulses (a) and (b).

Pulse (c), representing the actual object distance, is compared against a pulse representative of the maximum focusing position or "infinity stop" of the lens system. This pulse, as shown at (d), is developed at line 104 by a maximum range signal generator shown encircled in dotted lines at 106. In operation, the generator 106 receives clock pulse (a) from trunk line 100 at junction 108. Clock pulses (a) are introduced into a gate 110 which maintains a preselected output potential in its untriggered state. When triggered by a pulse (a), the gate 110 will go to ground or lowered reference potential and thereby cause the charging of capacitor 112 through a resistor 114 and B+ source. As the capacitor 112 commences to be charged, an amplifier 116 will be energized to evolve a pulse of width determined by its period of energization. A feedback from the amplifier 116 output along line 118 serves to maintain gate 110 in a continually active state throughout the charging of capacitor 112. It will be apparent that the width of pulse (d) will correspond to the time interval required to charge capacitor 112 in the R-C circuit. By selecting appropriate values of resistance and capacitance a pulse width representative of a maximum lens focusing position may be readily derived.

Pulse signal (c), which is used to represent the actual object distance, and pulse signal (d) representing the minimal object distance of maximum lens focusing translation are presented simultaneously from lines 102 and 104 to a pulse width discriminator 120. Discriminator 120 selects the signal having the shorter pulse width and presents the same at line 122 as a signal (e). Signal (e) is depicted in FIGURE 4 for illustrative purposes as representative of a selection of signal (c). Thusly selected, the signal is utilized for its pulse width representation of the object distance to which the camera lens system should be adjusted. To adjust the lens system 24 into a position in focus at the object distance, it is necessary to derive an error signal representing the amount of focal adjustment required. The present circuitry derives this signal by comparing the signal of object distance (e) with a signal representing the distance at which the lens system is actually focused. This latter signal is derived by a lens position signal generator circuitry shown encircled by dotted lines 124. In operation, the generator at 124 receives clock pulse (a) from trunk line 100 at junction 126 for introduction to a gate 128. Gate 128 maintains a preselected output potential in its untriggered state. When triggered by a pulse of signal (a), the gate 128 will go to ground or lowered reference potential and thereby cause the charging of capacitor 130 through a variable resistor 132 and B+ source. As the capacitor 130 is charged, an amplifier 134 will be energized to evolve a pulse of width determined by the interval required to charge capacitor 130. A feedback 136 from the amplifier 134 output serves to maintain gate 128 in a continually active state throughout the charging of capacitor 130. As in the case of the signal generator at 106 the width of signal pulse (f) developed along line 138 by the lens position generator will be determined by the resistance value at variable resistor 132. Variable resistor 132 is structured so as to provide values of resistance corresponding to the object distance at which the lens system is focused at any time. Its mechanical connection with the lens manipulating mechanism is shown by a dotted line 140. A structure for such a resistor is discussed in detail hereinafter. It will be apparent that the selection of values of resistance for resistors 114 and 132 will effect a compensation for the double object distance representation of signal (c).

From the waveform diagram of FIGURE 4, it will be apparent that the minimum object distance to which the lens system will adjust is established by the length of pulse (a). Accordingly the system of the invention may be made sensitive to both limiting focal positions of a camera objective.

The error signals required in the adjustment of the camera lens system must function to provide information as to the amount of lens translation and the direction of axial correction necessary to effect proper focusing. This information is derived at the pulse width discriminator 142. Exemplary waveform signals developed in the discriminator are illustrated in FIGURE 5.

Discriminator 142 is capable of assuming one of three possible signal states at its output lines 144 and 146. The interrelationships of these states will be seen to determine whether lens system focusing adjustment is required and what axial direction the correction should take. Using digital terminology, output lines 144 and 146 may respectively assume an "on-off", an "off-on" or an "off-off" state. The latter state describes a null or "in focus" condition, while the former indicate a contracting or expanding direction of lens translation. For illustrative purposes, the discriminator will be described as providing an "off" output at line 144 and an "on" output at line 146.

Signals (e) and (f) representing object distance and lens position are submitted respectively to discriminator 142 from along lines 122 and 138. Within the discriminator a gate 148 will receive a pulse (e) from line 150. Gate 148 will simultaneously receive a pulse (g) from line 152. The latter signal represents pulse (f) having been inverted at 154. Gate 148 is selected to react to a logic summation of signals derived from pulses (e) and (g) by assuming a nonconducting or "off" state at line 144, i.e., no signal appears. This state is represented as (h). An "off" state will always be present if there is no common "low" between the pulses. Dotted lead lines are provided in FIGURE 5 to more clearly point out this lack of commonality.

Gate 156 is connected to receive signal pulse (f) from along line 158 and, simultaneously, signal pulse (i) from along line 160. Signal (i) will be recognized as signal (e) having been inverted at 162. Gate 156 is selected to react to the common "low" between signals (i) and (f) by assuming an "on" state. This results from the logic summation of signals (i) and (f). Accordingly, a signal (j) appears and is presented at line 146 having a pulse width representative of the degree of lens correction required. The signal is also part of an "off-on" state representing the direction which the correction must take.

From the foregoing illustration, it will be apparent that should the width of pulses (f) be larger than those of signal (e) an oppositely directed correction will ensue with gate 148 conducting and gate 156 assuming a non-conducting or "off" state. Should the pulses of signals (c) and (f) be of equal width, a null condition will result with no signal being present at either line 144 or line 146. The latter "off-off" state indicates that the lens system is in proper focus.

The error signal represented by the output of lines 144 and 146 are ultimately utilized to drive a lens coupled servomotor 50 in one direction or another for a specific distance to evolve appropriate focusing. To provide a signal more efficiently utilized by a D.C. motor control circuit or the like, pulse stretchers 164 and 166 are inserted respectively into lines 144 and 146. Returning to the illustrative signal heretofore discussed, the stretcher 166 will convert signal (j) into a waveform such as that depicted at (k). This signal is presented upon line 168, while waveform (h) remains at line 170. From these lines the error signal is directed into a bridge circuit 172 which serves to directionally orient the energization of servomotor 50. Signal (k) at line 168 will energize the base electrode of transistor 174 and cause its conduction to, in turn, energize the base electrode of a transistor 176 from along emitter output line 178 and transistor 180 from line 182. The conductive status of transistors 176 and 180 will permit the passing of current from a voltage source 184 across transistor 180 and into one terminal of servomotor 50 through line 186. Current will return from servomotor 50 through line 188 and transistor 176 to ground 190. Similarly, should an output signal have appeared at line 170, servomotor 50 will receive oppositely directed current from D.C. source 184 by virtue of the base electrode energization and consequent conductive status of transistors 192, 194 and 196. Base resistors as at 198, 200, 202 and 204 are inserted into the bridge circuitry for correct limiting purposes. Similarly, those familiar with the art will recognize that transistors 174 and 192 are present to provide a power gain function. The mechanical interconnection of servomotor 50 with the translational function of a camera lens system 24 is indicated by a dotted line 206. From the foregoing it will be apparent that the power source 184 is, in effect, triggered into use by the circuitry 172 during the interval of a signal pulse such as that at (k). Operational advantages accruing from the use of a separate power source for driving servomotor 50 will be apparent.

Figure 6:
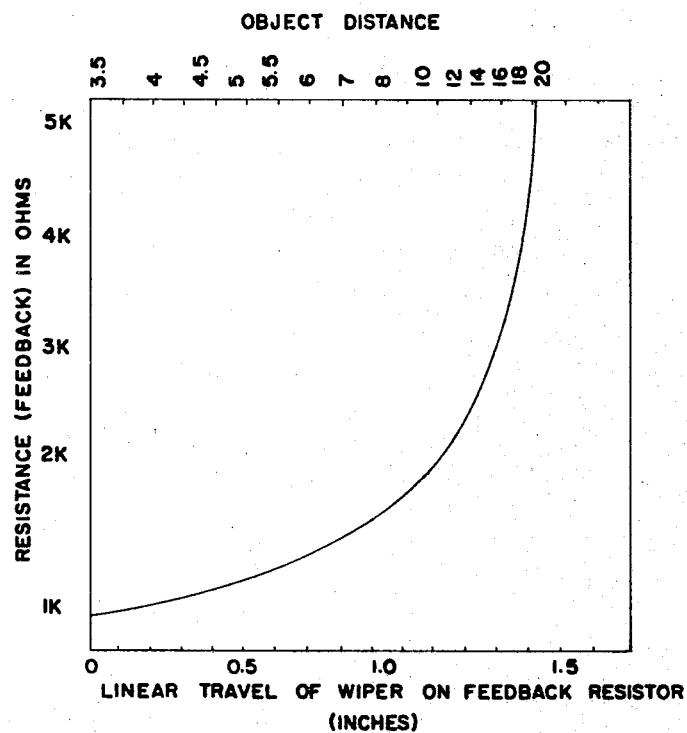
FIGURE 6 is a chart showing a relationship of feedback resistance to object distance and wiper position for a variable resistor as shown in FIGURE 7.
Figure 7:
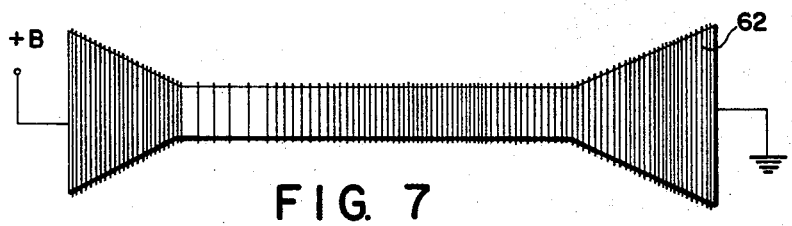
FIGURE 7 is a plan view of a variable resistor element which may be incorporated with the lens translational actuator of the invention depicted in FIGURE 1.

During operation, an error signal will drive servomotor 50, which will, in turn, mechanically alter lens system 24 as indicated at 206 and correspondingly vary the value of resistance of resistor 132 through coupling 140. Corrective movement will continue until a null or "off-off" status is achieved. The resistor 132-servomotor 50 inter-relationship may assume any of a broad variety of configurations. One operable arrangement has been illustrated in FIGURE 1 in connection with the variable resistor 61. The calibration of resistor 61 requires a correlation of the position of wiper arm 60 with lens position and corresponding object distance. A typical relationship of these parameters with resistive values may typically result in the curve of FIGURE 6. A shape for a resistor element having resistance values corresponding with those of the curve is illustrated for exemplary purposes in FIGURE 7.

The above-described circuitry is amenable to a variety of alterations without departing from the scope of the invention. For instance, a galvanometer arrangement may be substituted for the variable resistor 132 alone with minor circuit changes. Further, the power supplies indicated separately in the drawings for illustrative purposes may be unified. Also, a singular transceiver may be used in place of the dual transducers 88 and 92. However, in view of the relatively high "Q" characteristics of sonic transducers, it may be impractical to provide adequate damping within the allotted pulse interval, for example 5 ms. Additionally, a manual override switch may be found useful for situations such as those requiring focusing beyond an acoustically opaque but visually transparent surface. The rangefinder embodiment illustrated in the drawings, while remaining capable of providing adequate performance, is readily adaptable to miniaturized designs. Such smaller versions of the unit may be found more desirable where extensive commercial production is contemplated.

Since certain changes may be made in the above system and apparatus without departing from the scope of the invention herein involved, it is intended that all matter contained in the above description or shown in the accompanying drawings shall be interpreted as illustrative and not in a limiting sense.

We claim:
1. In combination:
   a camera having a lens system adapted to be focused upon a remote object;
   transmitting means for propagating an acoustic signal in the direction of said object;
   receiving means for detecting the reflections of said acoustic signal from said object; and
   means controlled by said receiving means for adjusting said lens system to a focus upon said object.

2. Apparatus for causing the lens system of a camera to focus upon an object separated therefrom by an object distance comprising:
   transmitting means for propagating an acoustic signal in the direction of said object;
   receiving means for detecting the reflections of said acoustic signal from said object and deriving therefrom a first reference signal representative of said object distance;
   signal generator means for generating a second reference signal representing a predetermined object distance corresponding to a limiting focusing position of said lens system;
   discriminator means for selecting the said reference signal representing the lesser of said distances; and
   lens system adjustment means responsive to the said selected signal for focusing said lens system at a distance which it represents.

3. Coupled rangefinding appratus for causing the lens system of a camera to focus upon an object separated therefrom at an object distance comprising:
   transmitting means for propagating a sonic signal in the direction of said object;
   receiving means for detecting the reflections of said signals and deriving therefrom a first train of signal pulses having lengths modulated to correspond with said object distance;
   signal generator means for generating a second train of signal pulses, each having a length representing a predetermined object distance corresponding to a limiting focusing position of said lens system;
   discriminator means for selecting the said train having signal pulses representing the lesser of said object distances; and
   lens system adjustment means responsive to the said selected signal pulses for focusing said lens system at an object distance which they represent.

4. The rangefinding apparatus of claim 3 including:
   oscillator means for providing a train of regularly recurring clock pulses of uniform length; and
   wherein said transmitter means is adapted to provide bursts of traveling wave acoustic energy toward said object in response to said clock pulses.

5. The rangefinding apparatus of claim 4 in which said receiving means includes:
   a transducer having a frequency response oriented to receive said echo pulse and derive therefrom an electrical echo signal; and amplifier means for amplifying said electrical echo signal.

6. The coupled rangefinder apparatus of claim 4 including:
readout means responsive to each said transmitted burst and said echo pulse for deriving said first train of signal pulses as a pulse length modulated signal corresponding to the duration of the echo interval between the transmission of each burst and detection of the echo thereof.

7. The coupled rangefinder apparatus of claim 4 including:
readout means responsive to each said clock pulse and said echo pulse for deriving said first train of signal pulses as a pulse length modulated signal corresponding to the duration of the echo interval between the transmission of each burst and detection of the echo thereof.

8. The coupled rangefinder apparatus of claim 4 including:
a readout flip-flop circuit having means responsive to said clock pulses for coupling said flip-flop in a first stability condition and responsive to said echo pulses to reverse said stability condition, whereby said first train pulses are formed as the interval between successive said stability conditions.

9. The coupled rangefinder of claim 4 wherein said second train signal generator means comprises fixed resistor means having a resistance value selected for charging a condenser within a time interval defined by the said length of a second train pulse; and gating means responsive to each said clock pulse for triggering the charging of said condenser.

10. A coupled rangefinding apparatus for causing the lens system of a camera to focus upon a target separated therefrom by an object distance comprising:
acoustic energy ranging means for deriving a first train of discrete signal pulses having lengths representative of said object distance;
signal generator means for generating a second train of discrete signal pulses, each having a length representing a predetermined object distance corresponding to a limiting focusing position of said lens system;
lens position signal means for generating a third train of discrete pulses representing the object distance at which said lens system is focused;
discriminator means for comparing said third train pulses with the pulses representing the lesser of said object distances and deriving therefrom an error signal;
actuator means responsive to said error signal for causing the adjustment of said lens system to a focus at said lesser object distance.

11. The coupled rangefinding apparatus of claim 10 in which said acoustic energy ranging means includes:
means for generating a train of regularly recurring clock pulses of uniform length;
transmitter means responsive to said clock pulses for successively transmitting bursts of traveling wave acoustic energy toward said target; and
detecting means for receiving an echo pulse of each said burst of acoustic energy reflected from said target.

12. The rangefinding apparatus of claim 11 wherein said detecting means includes:
a transducer having a frequency response oriented to receive said echo pulse and derive therefrom an electrical echo signal; and
amplifier means for amplifying said electrical echo signal.

13. The coupled rangefinder apparatus of claim 11 including:
readout means responsive to each said clock pulse and said echo pulse for deriving said first train of signal pulses as a pulse length modulated signal corresponding to the duration of the echo interval between the transmission of each burst and detection of the echo thereof.

14. The coupled rangefinder apparatus of claim 11 including:
a readout flip-flop circuit having means responsive to said clock pulses for coupling said flip-flop in a first stability condition and responsive to said echo pulses to reverse said stability condition, whereby said first train pulses are formed as the interval between successive said stability conditions.

15. The coupled rangefinder apparatus of claim 11 wherein said second train signal generator means comprises fixed resistance means having a resistance value selected for charging a condenser within a time interval defined by the said length of a second train pulse; and gating means responsive to each said clock pulse for triggering the charging of said condenser.

16. The coupled rangefinding apparatus of claim 11 including:
manual sighting means fixed to said camera for defining the periphery within which said first train of pulses is confined.

17. The coupled rangefinding apparatus of claim 12 wherein said manual sighting means comprises a partially transparent disc disposed centrally within a viewfinder of said camera.

18. The coupled rangefinding apparatus of claim 11 wherein said lens position signal means comprises:
a variable resistor connected for charging a condenser within an interval defining each said third train pulse and gating means responsive to each said clock pulse, for triggering the charging of said condenser.

19. The coupled rangefinding apparatus of claim 18 wherein said actuator means includes coupling means in association between said variable resistor and said lens system, for causing a variation of resistance of the resistor in correspondence with the adjustment of the lens system.

20. The coupled rangefinding apparatus of claim 19 wherein said actuator means includes a direct current motor selectively energized in response to said error signal and connected to drive said coupling means.